Dec. 23, 1952 W. E. BUCK 2,623,183
INFRARED RECEIVER
Filed Sept. 1, 1948

INVENTOR.
WILLARD E. BUCK
BY *M. O. Hayes*
Attorney

Patented Dec. 23, 1952

2,623,183

UNITED STATES PATENT OFFICE 2,623,183

INFRARED RECEIVER

Willard E. Buck, Los Alamos, N. Mex.

Application September 1, 1948, Serial No. 47,320

2 Claims. (Cl. 250—83)

(Granted under the act of March 3, 1883, as amended April 30, 1928; 370 O. G. 757)

This invention relates to apparatus and methods for converting invisible electromagnetic wave energy into visible electromagnetic wave energy, i. e. a light image. More particularly, it is contemplated that this invention will be used to convert an infra-red image into a visible image.

Present types of infra-red converters are complicated by the requirement of high voltage equipment needed to draw electrons through a space discharge path in accordance with the photoelectric effect or other phenomena. It is an object of this invention to provide an electromagnetic wave transducer which may be made simple and compact and without a high voltage source, the only power requirement being a small source of energy needed to energize a small light bulb.

Many types of transducers require a scanning electron beam with its associated complex and bulky circuitry. It is an object of this invention to simplify transducer construction by eliminating the scanning electron beam found in prior art transducers.

The elimination of much electric gear results in the fulfillment of another object of this invention, which is to provide a device of simple and rugged construction without complicated parts, so that rough field use may be made of the device without fear of damage.

It is another object of this invention to provide an infra-red converter which does not require an associated ancillary source of infra-red radiation for the effective detection and observation of objects.

It is another object of this invention to provide an electromagnetic wave transducer having an increased range of object detection.

It is another object of this invention to provide an electromagnetic wave transducer having a speed of response as rapid as the eye can follow.

It is a further object of this invention to provide a device particularly useful in the detection of aircraft in the night sky.

It is an additional object of this invention to provide a device by means of which heat patterns of terrain may be studied either by eye or by taking motion pictures thereof.

It is a further object of this invention to provide a simplified transducer in which the change from an infra-red image to a visible image is made directly and without the complicated intermediacy of involved apparatus.

It is a still further object of this invention to provide an electromagnetic wave transducer in which a single member acts to absorb invisible energy and to produce an image which may be made visible.

Other objects and many of the attendant advantages of this invention will be readily appreciated as the same becomes better understood by reference to the following description.

In accordance with this invention there is provided a support member on which is mounted a plurality of elements having light-altering faces movable with respect to the member in response to reception of electromagnetic wave energy, such as an infra-red image. This plurality of elements is preferably made of single physical members such as a skin or pellicle of collodion, or the like, the pluralizing being achieved by mounting the skin over a grid formed on the surface of the support member. The movability of the energy responsive elements is achieved by making the skin so thin that it flexes in and out in response to the temperature resulting from the absorption of the electromagnetic wave energy image falling thereon. Movement of each skin element is preferably effected by employing the grid cavities or intestices as sealed chambers, the air in which expands upon increase in temperature, thereby flexing or bulging each skin element outwardly.

The several skin elements are endowed with light-altering properties by coating a reflective face on one side of the skin. Then when the reflective faces are illuminated with visible light, the character of the observed light reflection will be determined by the degree to which each skin element has been flexed by the enrgy pattern in the received electromagnetic wave image.

The grid, with its covering skin, is preferably formed on a glass plate and disposed with the skin positioned to receive electromagnetic energy, as from the infra-red image of an object focused on the skin by an objective optical system. Since all objects emit electromagnetic radiation in accordance with their absolute temperature, each element of the grid mounted skin assumes an attitude depending upon its temperature as determined by the received radiation image falling thereon.

The reflective faces of the skin elements are illuminated by any suitable source of light, and the reflected image created by the minute flexings of the skin elements is observed through any suitable optical system.

In accordance with the invention described generally above, certain preferred embodiments will now be described in detail with reference to the drawing, wherein.

Figure 1:
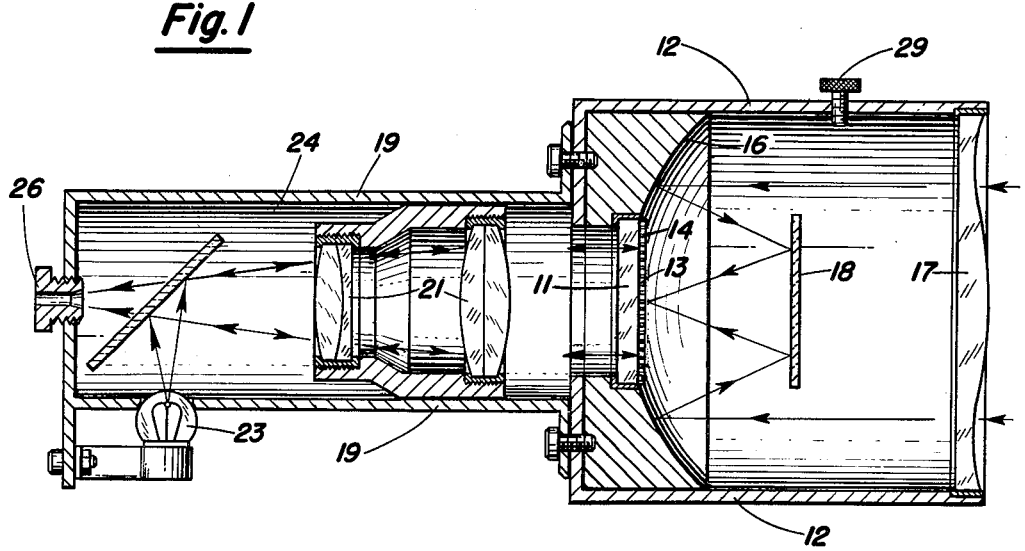
Fig. 1 is a longitudinally sectioned view of apparatus embodying the instant invention.

Referring to Fig. 1, 11 designates a plate of transparent material such as glass mounted transversely in a sealed housing 12. On one face of the plate 11 is formed an orthogonal grid 13 overlaid by a pellicle or skin 14 of collodion. The grid 13 may be formed on the plate 11 by first covering the plate with a suitable protecting film, then scoring the film orthogonally, and coating the glass plate 11 with silver in the scored lines. Copper is then electro-plated to the silver until the desired grid thickness is attained. An extremely thin film of cellulose nitrate dissolved in amyl acetate (the thickness of the film being less than 0.4 microns) is formed on a water surface and is then applied directly over the grid 13.

The glass plate 11 is mounted in the center of a spherical reflecting face 16 mounted in the housing 12. The face 16 constitutes an objective mirror faced toward the object to be perceived, and is part of an over-all lens system including a corrector plate 17 and a planar mirror 18. The lens system comprising the optical elements 17, 16, and 18 which focus the electromagnetic wave image on the skin 14 is basically a Schmidt objective, for further description of which reference is made to "The Schmidt Camera" by C. H. Smiley, Popular Astronomy, 44, 415 (1936).

A viewing housing 19, mounted to the housing 12, contains a lens system 21 for applying parallel light rays to the inside skin face 22, which is silvered to enhance its reflecting properties. A light source consisting of a small bulb 23, mounted in the side wall of the housing 19, directs rays onto the lens system 21 by means of an obliquely disposed plate 24, the face of which is partially transmitting and partially reflective. The image formed by reflection of the light from the elemental segments of the skin 14 passes through the plate 24 and is focused upon an eye piece, such as a pin hole member 26, disposed at the end of the housing 19 in line with the lens system 21.

Operation

Figure 2:
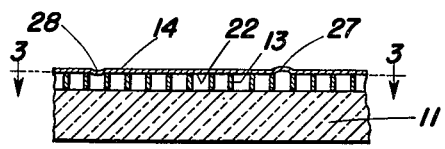
Fig. 2 is an enlarged fragmentary section of the energy transducer member forming a part of the over-all apparatus shown in Fig. 1.
Figure 3:
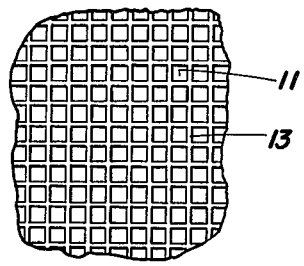
Fig. 3 is a face view showing the grid-like nature of the transducer member, taken along line 3—3 in Fig. 2.

In operation, the radiation image from an object to be observed is focused by the Schmidt lens system 17, 16, 18 onto the skin 14. The minute cells or chambers formed by the grid 13 over which the skin 14 is mounted are heated by energy absorbed in accordance with the radiation image. This heating causes each element of skin covering each chamber to bulge outwardly, for example, as shown at 27 (Fig. 2). This leaves only a small portion of the silvered face 22 normal to the light path in the lens system 21. Thus those elements which are heated most will disperse most of the light, and that portion of the image, when viewed through the eye piece 26, will be darkest. If there is no heating at all, the silvered surface 22 will be perfectly flat and maximum light will be reflected to the eye piece 26. The net effect to the viewer will be the observation of an image which is a negative of the object being viewed. That is, portions of the object which give off greatest radiation will be darkest, with infinite gradations of the image to those portions which give off least radiation and which appear lightest.

If desired, an initial depression may be given each elemental segment of the skin 14 as shown at 28 (Fig. 2); so that reception of energy, instead of dispersing the light, tends to concentrate it by making the skin flatter, i. e. less knobby. In such a case the image observed will be positive rather than negative. Such initial depression may be effected by increasing slightly the air pressure within the sealed housing 12. This may be done by decreasing the internal volume of the housing, for example by the screwing in of a thumb screw 29 extending through the wall of the housing 12. The edges of screw 29 engage the housing wall tightly so as to prevent air leakage past the screw.

Modifications

Figure 4:
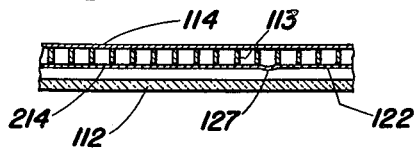
Fig. 4 is a section similar to Fig. 2 showing an alternative mode of constructing the transducer.

If desired, the grid 13, instead of being formed on a solid member 11 may stand by itself as a lattice work, closed on both faces by collodion pellicles. As shown in Fig. 4, a grid 113 is covered on one face by a skin 114 and on the opposite face by a skin 214. In this embodiment one of the skins 114 may serve to receive and absorb the electromagnetic wave image, while the other film 214 bulges outwardly as shown at 127 in response to energy absorbed in the grid cavity. In this case the silver surface 122 is placed on the outside of the flexing member 214.

Figure 5:
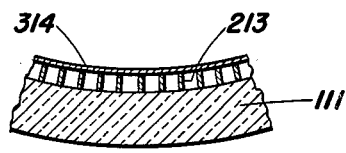
Fig. 5 shows another alternative type of transducer.

If desired, the separate lens system 21 may be eliminated, its function being assumed by applying a curved configuration to the plate 11, as shown at 111 in Fig. 5. The grid 213 and pellicle 314 of Fig. 5 are essentially the same as the corresponding elements in Fig. 2, the only difference being that they are formed on the slightly curved surface of the plate-lens 111 instead of on a flat surface.

The relatively coarse character of the grid 13 on the plate 11 is in fact an exaggeration to better illustrate the principles of this invention. In practice, the size of the grid walls 13, their relative height and spacing, and the thickness of the skin 14 are very minute compared to the dimensions of the plate 11 and the housing 12, so that much greater resolution of detail is actually obtained than would be indicated by the drawing.

If desired, the housing 19, with its associated lens and viewing system may be removed entirely and replaced by a flat, partial reflecting plate 112 spaced a few wave lengths in front of the film 214. Then, when the face 122 is illuminated by monochromatic light, the film 14 may be viewed directly, there being a full change from light to dark, due to optical interference of the light, whenever an elemental segment of the film 14 has moved one quarter wave length of the light. In this case, means must be provided for carefully regulating the range of energy intensities falling on the film from the radiation source. Without such regulation, increasing energy intensities will cause the received image point to pass successively through light and dark regions and produce multiple ambiguities in the image, which would render it meaningless.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. An electro-magnetic wave transducer comprising a sealed housing, a member constituting a wall of the housing and having a plurality of cavities on a surface thereof, a flexible skin mounted over said cavities and being thereby divided into skin segments, a face of said skin being light reflective, said segments being capable of flexing in and out of said cavities in response to reception of electro-magnetic wave energy, means for varying slightly the pressure within said housing, thereby to create an initial concavity or depression in said segment when no energy is being received, means disposed to focus an electro-magnetic wave image upon said segment thereby to increase the planarity of said face, means for illuminating said face with substantially parallel rays of visible light, and means for observing the light pattern reflected from said face.

2. A transducer according to claim 1, wherein said pressure varying means comprises a threaded plug extending through a wall of said housing.

WILLARD E. BUCK.

REFERENCES CITED

The following references are of record in the file of this patent:

UNITED STATES PATENTS

| Number | Name | Date |
|---|---|---|
| 2,424,976 | Golay et al. | Aug. 5, 1947 |
| 2,435,519 | Tolson | Feb. 3, 1948 |
| 2,456,801 | Tolson | Dec. 21, 1948 |